United States Patent
Outlaw et al.

(10) Patent No.: US 9,139,742 B2
(45) Date of Patent: Sep. 22, 2015

(54) LOW-GLOSS ANTI-GRAFFITI SURFACE FOR ELECTRONIC WHITE BOARDS

(75) Inventors: Mark O'Neil Outlaw, Charlotte, NC (US); Michael Ray Carter, Charlotte, NC (US)

(73) Assignee: Coveris Technology LLC, Spartanburg, SC (US)

( * ) Notice: Subject to any disclaimer, the term of this patent is extended or adjusted under 35 U.S.C. 154(b) by 1729 days.

(21) Appl. No.: 11/776,624

(22) Filed: Jul. 12, 2007

(65) Prior Publication Data

US 2009/0017313 A1  Jan. 15, 2009

(51) Int. Cl.
| | |
|---|---|
| *C08K 3/36* | (2006.01) |
| *C08K 5/103* | (2006.01) |
| *C08G 77/38* | (2006.01) |
| *C09D 4/00* | (2006.01) |
| *C09D 7/00* | (2006.01) |
| *C09D 5/16* | (2006.01) |
| *C08F 299/06* | (2006.01) |

(52) U.S. Cl.
CPC ............... *C09D 7/005* (2013.01); *C08G 77/38* (2013.01); *C09D 4/00* (2013.01); *C09D 5/1637* (2013.01); *C08F 299/06* (2013.01); *C08K 3/36* (2013.01); *C08K 5/103* (2013.01)

(58) Field of Classification Search
None
See application file for complete search history.

(56) References Cited

U.S. PATENT DOCUMENTS

| | | | |
|---|---|---|---|
| 3,966,572 | A | 6/1976 | Carder |
| 4,169,167 | A | 9/1979 | McDowell |
| 5,811,472 | A | 9/1998 | Patel |
| 6,354,227 | B1 | 3/2002 | Feldpausch et al. |
| 6,423,418 | B1 | 7/2002 | Callicott et al. |
| 6,426,034 | B1 | 7/2002 | McComas et al. |
| 6,448,302 | B1 | 9/2002 | Dawson et al. |
| 6,476,965 | B1 | 11/2002 | He et al. |
| 6,760,999 | B2 | 7/2004 | Branc et al. |
| 6,787,225 | B2 | 9/2004 | Dawson et al. |
| 6,833,186 | B2 | 12/2004 | Perrine et al. |
| 2003/0194549 | A1 | 10/2003 | Perrine et al. |
| 2004/0077497 | A1 | 4/2004 | Korane et al. |
| 2005/0112324 | A1 | 5/2005 | Rosenbaum et al. |
| 2005/0260414 | A1* | 11/2005 | MacQueen ................ 428/421 |
| 2006/0287408 | A1* | 12/2006 | Baikerikar et al. ............ 522/71 |
| 2008/0318064 | A1 | 12/2008 | Outlaw et al. |
| 2010/0327493 | A1* | 12/2010 | Fong et al. .................... 264/401 |

FOREIGN PATENT DOCUMENTS

| | | |
|---|---|---|
| EP | 0442305 | 8/1991 |
| EP | 1 930 381 | 6/2008 |
| FR | 2630353 | 10/1989 |
| WO | 0153421 | 7/2001 |
| WO | WO 2007043728 A1 * | 4/2007 |
| WO | 2009/002814 | 12/2008 |

OTHER PUBLICATIONS

[Darocur 1173] data sheet (Apr. 2001).*
[Photomer 5010] data sheet (Oct. 2003).*

(Continued)

*Primary Examiner* — Frank D Ducheneaux
(74) *Attorney, Agent, or Firm* — Stoel Rives LLP

(57) ABSTRACT

The present invention is an electronic whiteboard having a low-gloss surface with anti-graffiti properties.

31 Claims, 2 Drawing Sheets

(56) References Cited

OTHER PUBLICATIONS

[Photomer 6019] data sheet (Sep. 2009).*
[Photomer 5429] data sheet (Apr. 2006).*
[Photomer 4399] data sheet (Sep. 2009).*
[Photomer] products data sheet (2003).*

Office Action of foreign counterpart application No. EP 08 771 547.0 mailed Apr. 6, 2010.
International Search Report for foreign counterpart Application No. PCT/US2008/067603; mailing date Sep. 3, 2008; 2 pages.
International Search Report for foreign counterpart Application No. PCT/US2008/067598; mailing date Sep. 4, 2008; 3 pages.

* cited by examiner

LOW-GLOSS ANTI-GRAFFITI SURFACE FOR ELECTRONIC WHITE BOARDS

BACKGROUND

The present invention relates to a low-gloss electronic whiteboard having anti-graffiti properties. Further, the present invention relates to a coating formulation that imparts anti-graffiti properties to electronic whiteboards. More specifically, the invention relates to an EB (electron beam) curable or UV (ultra violet) curable, low-gloss coating formulation for electronic whiteboards with anti-graffiti properties. The invention further relates to methods of manufacturing a low-gloss coating formulation.

Electronic whiteboards also referred to as interactive whiteboards, are powerful presentation tools that are touch sensitive. These can be connected to various devices such as a projector, a computer, DVD, and VCR.

Electronic whiteboards have optical and electronic capabilities to produce surfaces from which images can be reproduced, either on paper or digitally. Some electronic whiteboards may include a tray with virtual pens (e.g., magnetic or digital pens) and eraser. These pens can be configured to any color or width. When a pen is used on the whiteboard, it displays virtual ink that is fed through the computer to the projector. A person can write notes and pictures on the electronic whiteboard. The software that is available with the whiteboard can then take the virtual writing (e.g., digital image) and transform them to printed text. This text can be shared by various ways such as by printing, saving its digital copy, loading it online, or e-mailing.

Electronic whiteboards typically offer display spaces that function like oversize touch-screen computer monitors. In many of the high-tech whiteboards that have hit the market in the past few years, every mark made on the board can be saved on a computer and then easily uploaded to a website or broadcast to students at a distance.

Because of the capabilities that go far beyond those of traditional whiteboards, and due to their flexibility and convenience, electronic whiteboards are gaining popularity. They are being used extensively as teaching aids in classrooms to enhance lesson plans. Further, they are being used in business conferences to enhance presentations (e.g., PowerPoint presentations).

Electronic whiteboards, however, can have certain drawbacks. For instance, for electronic whiteboards that are designed for virtual pens, ink markers can be a very serious problem. This is because people often by mistake or by lack of knowledge, destroy the surface of these electronic whiteboards by writing on their surface by ink markers, especially permanent markers.

Thus, to avoid damage to the surface of these electronic whiteboards, whiteboards with anti-graffiti properties are desirable.

In addition, electronic whiteboards generally have high gloss surfaces. High gloss surfaces tend to create eyestrain and are difficult to see from certain angles. Thus, in many applications, low-gloss surfaces are desirable because they reduce eyestrain and can be viewed more easily from different angles.

Accordingly, there is a need for electronic whiteboards that have a surface with anti-graffiti properties. This would help provide a clean and re-usable electronic whiteboard surface.

In addition, there is a need for electronic whiteboards with very low gloss. The low gloss property is useful in reducing eyestrain and facilitating the reading of contents on the electronic whiteboard effortlessly from different angles.

SUMMARY

In one aspect, the present invention is a low-gloss electronic whiteboard having anti-graffiti properties.

In another aspect, the present invention is a coating formulation that imparts anti-graffiti properties to electronic whiteboards. More specifically, the invention relates to an EB (electron beam) curable or UV (ultra violet) curable, low-gloss coating formulation for electronic whiteboards having anti-graffiti properties.

In another aspect, the invention is a method of manufacturing a low-gloss coating formulation for electronic whiteboards with anti-graffiti properties.

The foregoing, as well as other objectives and advantages of the present invention and the manner in which the same are accomplished, is further specified within the following detailed description and its accompanying drawings.

DETAILED DESCRIPTION

The present invention is an electronic whiteboard having a low-gloss surface with anti-graffiti properties.

As used herein, an electronic whiteboard has a writing surface with an input area on which virtual pens (e.g., digital or magnetic pens) are used for writing purposes as opposed to conventional markers. Those having ordinary skill in the art will understand that circuitry is associated with the input area for detecting and determining the position of a virtual pen on the input area. The information generated by the position of the virtual pen is then identified and communicated to a processor (e.g., a computer) connected to the input area.

In one aspect, the present invention is an EB/UV-curable low-gloss coating formulation for coating electronic whiteboards having anti-graffiti properties.

In one embodiment, the invention is a coating formulation formed from an acrylate silica blend (i.e., a blend of a polyester acrylate, an aliphatic acrylate, acrylic monomer, and silica), a urethane acrylate or a polyester acrylate, a polyfunctional reactive diluent, and a silicone (e.g., cross-linkable silicone acrylate).

For UV-curable applications, the coating formulation according to the present invention may further include at least one photoinitiator (e.g., 2-hydroxy-2-methyl-1-phenyl-propan-1-one or 1-hydroxy-cyclohexyl-phenyl-ketone).

In addition, the coating formulation may include a polymeric dispersant for evenly dispersing various ingredients (e.g., silica) of the coating formulation.

The acrylate silica blend (e.g., PHOTOMER® 5010) in the coating formulation is the primary gloss reducing binder in the EB/UV-curable coating formulation. It produces low-gloss EB/UV-curable hardcoats in difficult to matte EB/UV coatings while eliminating the need for dispersing equipment and handling silica. This formulated product can be incorporated into the coating formulation by simple mixing. In addition, this formulated product forms an incompatible phase during curing to produce microroughness. The presence of silica as well as the microroughness formed from the incompatible phase may be responsible for the low gloss values of the present coating formulation.

The aforementioned acrylate silica blend typically includes dipropylene glycol diacrylate in an amount between about 30 to 50 weight percent of the blend. Further, it may include isodecyl acrylate in an amount between about 10 to 30 weight percent of this blend. In addition, a polyester acrylate may be added to the silica blend in an amount between about 30 to 50 weight percent of the blend. The aliphatic acrylate is typically responsible for forming an incompatible phase during curing to produce microroughness. The coating may further contain silica in an amount between about 0.1 to 20 weight percent of the blend. The silica also contributes to the microroughness that occurs as the hardcoat is formed.

Figure 1:
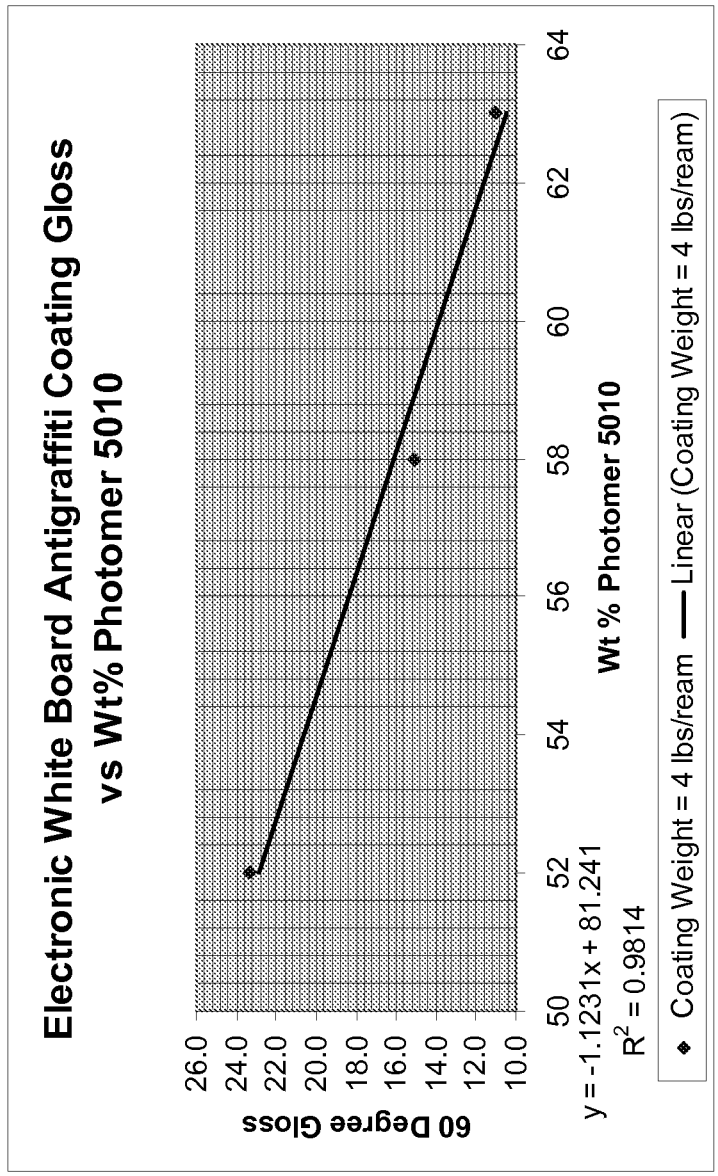
FIG. 1 illustrates that for the hardcoat formed from the coating formulation of the present invention, gloss is inversely proportional to the concentration of PHOTOMER® 5010 in solid state of the coating formulation.

Typically, for the hardcoat formed from this coating formulation, gloss is inversely proportional to the concentration of the acrylate silica blend. See FIG. 1, which plots 60-degree gloss versus concentration of PHOTOMER® 5010 as applied at 4 lbs/ream (wherein one ream is equal to 3000 sq.ft.).

In one embodiment, the acrylate silica blend is present in the coating formulation in an amount between about 30 and 80 percent by weight. Typically, the acrylate silica blend is present in the coating formulation in an amount between about 50 and 75 percent by weight (e.g., between about 55 and 70 percent by weight).

An aliphatic urethane acrylate (e.g., PHOTOMER® 6019) may be added to the acrylate silica blend to improve the properties of cured coatings produced from the coating formulation of the present invention. For instance, an aliphatic urethane acrylate may be added to enhance the non-yellowing characteristics of the coating film (i.e., the hardcoat) formed from the coating formulation of the present invention. Those skilled in the art will recognize the benefits of using aliphatic versus aromatic urethane acrylates for their non-yellowing characteristics. Further, aliphatic urethane acrylates may enhance physical properties of the coating formulation such as scratch, scuff, and mar resistance.

In another embodiment, a polyester acrylate (e.g., PHOTOMER® 5429) may be added to the coating formulation instead of an aliphatic urethane acrylate.

The aliphatic urethane acrylate (alternatively, a polyester acrylate) may be present in the coating formulation in an amount between about 1 and 20 percent by weight. Typically, the aliphatic urethane acrylate is present in the coating formulation in an amount between about 5 and 15 percent by weight.

A polyfunctional reactive diluent (e.g., PHOTOMER® 4399) may be added to the coating formulation of this invention to further enhance the properties of cured coatings/hardcoats. This may be added for improving abrasion and scratch resistance of the cured coatings. These compounds may also impart hardness to the cured coatings.

Those skilled in the ordinary art will recognize that a polyfunctional reactive diluent such as a pentafunctional acrylate monomer would increase crosslink density and therefore the hardness, toughness, and chemical resistance, in general when reacted with other oligomers and monomers. In this regard, those skilled in the art will know that oligomers, as defined by the International Union of Pure and Applied Chemistry, are "molecule(s) of intermediate relative molecular mass, the structure of which essentially comprises a small plurality of units derived, actually or conceptually, from molecules of lower relative mass." (1996 IUPAC, Pure and Applied Chemistry 68, 2287-2311) Thus, the polyfunctional reactive diluent may be added to the coating formulation to increase the crosslink density of the coating during polymerization, using either EB or UV radiation, by linking together the oligomers present in the formulation.

In one embodiment, the polyfunctional reactive diluent is present in the coating formulation in an amount between about 5 and 40 percent by weight. Typically, the polyfunctional reactive diluent is present in the coating formulation in an amount between about 10 and 30 percent by weight. More typically, the polyfunctional reactive diluent is present in the coating formulation in an amount between about 15 and 25 percent by weight.

The coating formulation further includes anti-graffiti additives (e.g., silicones, fluorinated materials, and waxes) to impart anti-graffiti properties to the electronic whiteboard of the present invention. Typically, reactive silicones such as cross-linkable silicone acrylates are used (e.g., TEGO® RAD 2700).

In one embodiment, the cross-linkable silicone acrylate is present in the coating formulation in an amount between about 0.1 and 10 percent by weight. More typically, the cross-linkable silicone acrylate is present in the coating formulation in an amount between about 0.5 and 5 percent by weight.

Photoinitiators may be included in the coating formulation to initiate photopolymerization of chemically unsaturated prepolymers (e.g., the polyester acrylate oligomers) in combination with monofunctional or multifunctional monomers. When exposed to UV radiation, photoinitiators absorb light to produce free radicals. These free radicals initiate the polymerization of the unsaturated compounds in the coating formulation. Examples of non-yellowing and minimal yellowing photoinitiators that may be used in the coating formulation of the present invention include but are not limited to $\alpha$-hydroxyketones such as Ciba® DAROCUR® 1173 and Ciba® IRGACURE® 184.

Photoinitiators may be present in the coating formulation in an amount between about 0.5 and 5 percent by weight. Typically, the photoinitiators are present in the coating formulation in an amount between about 1.5 and 4.5 percent by weight.

Generally, more than one photoinitiator[s] may be added to UV-curable coating formulation of the present invention. Typically, at least two photoinitiators may be added to the coating formulation.

In addition, a polymeric dispersant such as a carboxyl functional polymer may be added to stabilize the silica in the coating formulation to prevent agglomeration that may cause coating streaks during application of the coating formulation. More typically, a carboxyl functional polyacrylate (e.g., TEXAPHOR® 3250) may be used as a polymeric dispersant due to its compatibility with the other compounds of the coating formulation.

The polymeric dispersant may include a solvent e.g., heavy aromatic naphtha (CAS 64742-94-5). It may further include propylene glycol methyl ether acetate.

This polymeric dispersant may be present in the coating formulation in an amount between about 0.01 and 1.5 percent by weight. Typically, the polymeric dispersant may be present in the coating formulation between about 0.05 to 1 percent by weight.

Depending upon the technique used for coating a surface, the present formulation may be dissolved in a solvent (i.e., t-butyl acetate, ethanol, toluene, ethyl acetate, isopropyl alcohol, toluene and their blends).

Typically, exempt solvents such as t-butyl acetate are preferred for inclusion in the present coating formulation. Those skilled in the ordinary art would appreciate that these types of solvents are preferred as they are exempt from regulation by the EPA as VOC's (Volatile Organic Compounds) since they have been determined scientifically not to contribute to the formation of ozone and thus are environment friendly. Of course, non-exempt solvents may also be used if compatible with the ingredients of the present coating formulation.

In another embodiment, the present invention is a low-gloss hardcoat with anti-graffiti properties that includes at least a portion of a substrate coated with the aforementioned coating formulation.

The substrate of the low-gloss hardcoat is typically formed of polymeric material, such as polyethylene terephthalate, polycarbonate, melamine, porcelain, coated paper, metal, or glass.

For example, DuPont Melinex 339 PET, White, 500 gauge, may be used as a substrate.

Generally, a substrate that is pre-treated on at least one side is used in the hardcoat formed from the present invention. This type of pre-treated polyester has enhanced adhesive properties. For instance, pre-treated polyesters such as white polyester and clear polyester may be used as substrates. Additionally films may be treated to improve hardcoat adhesion using corona discharge (i.e., an electrical discharge accompanied by ionization of atmospheric oxygen, which oxidizes the surface of the substrate, increases substrate surface tension, and improves its adhesive properties) or something similar.

In one aspect, the hardcoat formed from the coating formulation of the present invention may include a low-gloss of less than about 25 gloss units measured at 60 degrees. Typically, the gloss may be less than about 15 gloss units measured at 60 degrees.

Those skilled in the art know that specular gloss, i.e., the mirror-like reflection of light from a surface, is typically measured at an incidence angle of 60, 85, or 20 degrees using gloss meters. For instance, a 60-degree Novogloss gloss meter was used to measure the gloss of the coating formulation and the hardcoat of the present invention. The Novogloss unit is distributed by Paul N. Gardner Company in Pompano Beach Fla. It is manufactured by a UK company called Rhopoint Instrumentation. With respect to measurement, an internal test method based on ASTM D2457 was used.

Figure 2:
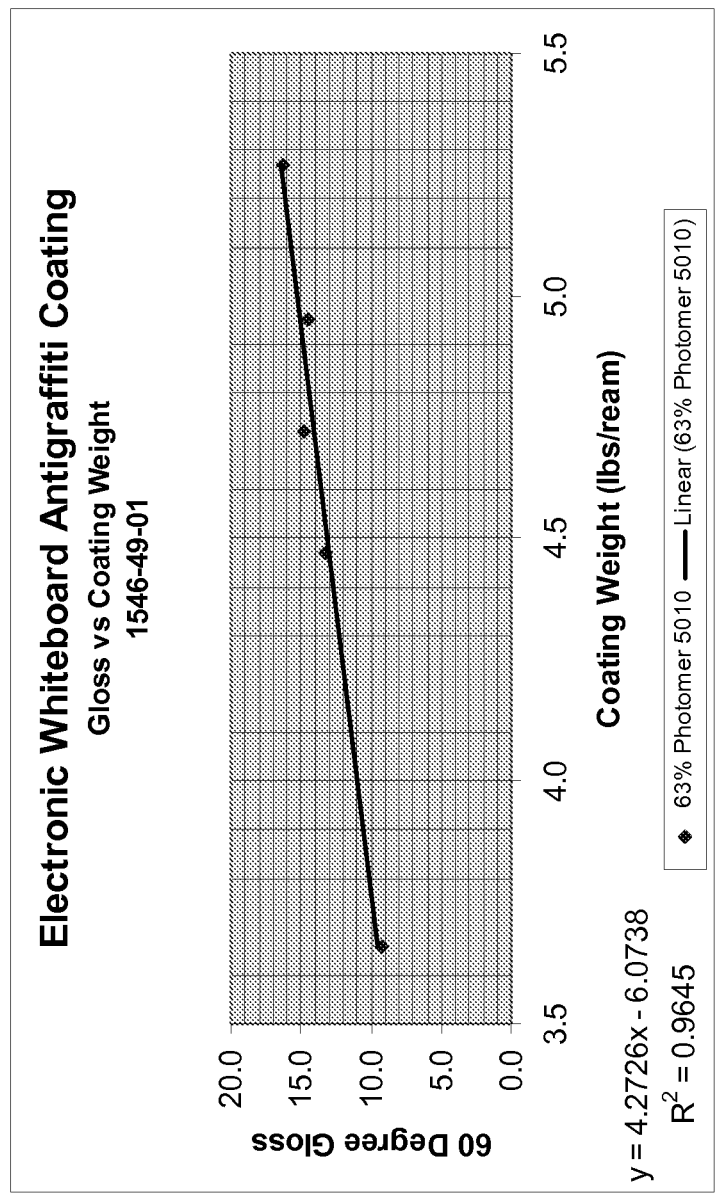
FIG. 2 illustrates that for the hardcoat formed from the coating formulation of the present invention, gloss is proportional to the coating weight of the coating formulation in solid state.

Those of ordinary skill in the art will appreciate that one of the variables affecting gloss is coating weight. Surprisingly, the gloss of the aforementioned hardcoat decreases as the coating weight decreases. See FIG. 2, which plots 60-degree gloss versus the amount deposited in pounds per ream (lbs/ream) at a concentration of PHOTOMER® 5010 of 63 percent by weight. Thus, FIG. 2 illustrates that for the hardcoat formed from the aforementioned coating formulation, gloss is proportional to coating weight. FIG. 2 illustrates that, at concentrations of the acrylate silica blend in the amount of between about 60 and 65 percent by weight of the coating formulation, the target 60 degrees gloss of between about 5 and 20 is obtained at coating weight of between about 3.5 and 5.5 lbs/ream.

In another embodiment, the present invention is a low-gloss electronic whiteboard with anti-graffiti properties. This whiteboard, along with the aforementioned coating formulation, may include a conductive film (e.g., vinyl films), a substrate, and/or a backing board. Those skilled in the art will know that the conductive film provides electrical contact that generates coordinates for precision mapping. The conductive film and the coating formulation are generally secured to opposite sides of the substrate.

Typically, the backing boards used in these whiteboards may be formed of polymeric material, such as polyethylene terephthalate, polycarbonate, melamine, porcelain, coated paper, metal, wood, or glass.

Table 1 (below) demonstrates some key optical and physical properties of the present low-gloss anti-graffiti coating formulation:

TABLE 1

| COATING WEIGHT (LBS/REAM) | 60 DEGREE GLOSS | PENCIL HARD-NESS | FLEXIBILITY, ½" BAR | CROSSCUT ADHESION |
|---|---|---|---|---|
| 4.95 | 14.5 | HB | NO CRACKING | PASS |
| 4.47 | 13.3 | HB | NO CRACKING | PASS |
| 3.66 | 9.3 | HB | NO CRACKING | PASS |

To assess the anti-graffiti properties and completeness of erasure, dry-erase markers from different manufacturers were used (e.g., Expo 2 Dry-erase Marker of Sanford Corporation, Oak Brook, Ill. 60523; and Avery Marks-A-Lot Whiteboard Dry-erase Marker of Avery Dennison Corporation; Brea, Calif. 92821). In addition, permanent markers from different manufacturers (e.g., Sharpie Permanent Marker of Sanford Corporation, Oak Brook, Ill. 60523 and Edding 850 Marker of edding AG/edding International GmbH, Ahrensburg, Germany) were used.

Red, green, blue, and black color dry-erase markers were evaluated from each manufacturer. In addition, red (Edding 850) and black (Sharpie) color permanent markers were evaluated to assess the anti-graffiti properties of the electronic board surface. A low-gloss anti-graffiti hardcoat formed from the composition according to the present invention was marked with each of the above-referenced color test marker and allowed to dry for at least one minute. The ink from all markers evaluated reticulated indicating poor wetting on the hardcoat surface; a desirable attribute of an anti-graffiti surface. The marking on the surface was then cleaned by rubbing the surface with a dry cotton cloth (such as a Webril Wipe of Fiberweb plc Corporate Office—London, 1 Victoria Villas Richmond GW2 9TW) or a micro fiber cloth. Alternatively, a Webril wipe or suitable soft cloth wet with a mild solvent such as isopropyl alcohol will facilitate ease of cleaning of the surface.

The results indicated that the ink on the low-gloss hardcoat surface was removable with no ghosting or perceptible image.

In a second experiment, the chemical resistance of the surface formed from the coating formulation of the present invention was evaluated by rubbing the surface with a methyl-ethyl-ketone (i.e., MEK) saturated Webril Wipe (Fiberweb plc Corporate Office—London, 1 Victoria Villas Richmond GW2 9TW for 100 cycles. After allowing the surface to dry, the anti-graffiti properties were evaluated using the above-named colors of test markers and erasing devices. In all cases, the ink from each marker was removable using a Webril wipe.

In addition, the 60-degree gloss value, after rubbing the anti-graffiti hardcoat surface with MEK saturated Webril Wipe for 100 cycles, was also evaluated to determine if surface gloss had been impacted. The 60-degree gloss values remained in the range of less than 25 gloss units and the change in gloss was less than 0.5 gloss units (11.0 before vs 10.7 gloss units after rubbing with MEK).

The data in Table 1 further indicates that the low-gloss anti-graffiti coating formed from the coating formulation of the present invention, when applied to a polyester film, did not crack during processing using a half-inch bar (i.e., A flexibility test was performed by cycling a 1"×12" test strip of the anti-graffiti coating, applied to a polyester film substrate formed from the formulation of the present invention, such that the non-coated side of the substrate was wrapped around ~50% of the ½" bar, and cycled back and forth much like a belt on a pulley. After 10 cycles the coating was not damaged (no visual cracking, flaking, or loss of adhesion). Those skilled in the art will understand that coatings that withstand this test without cracking, flaking, or losing of adhesion are substantially flexible.

In yet another aspect, the invention is a process for providing low-gloss hardcoat with anti-graffiti properties formed from the aforementioned coating formulation. Several coating methods suitable for coating flexible substrates in a roll-to-roll process including roll coating, gravure coating, meyer rod coating, and slot die coating can be used.

Typically, the slot die method is used due to its precision of coating weight control. This includes applying the coating formulation to a pre-treated substrate (e.g., web with good adhesion). The substrate along with the coating formulation is then dried in an oven. This vaporizes the solvent in the formulation. Thereafter, the coating is cured by exposing it to Electron Beam or UV radiation.

In one aspect, the coating may also be cured by exposing it to EB or UV radiation under a nitrogen atmosphere. Those of ordinary skill in the art would know that excluding oxygen with nitrogen inerting helps prevent undesirable reactions with oxygen that leads to an under cured coating, which enhances hardness.

In the specification and drawings, typical embodiments of the invention have been disclosed and, although specific terms have been employed, they have been used in a generic and descriptive sense only and not for purposes of limitation.

The invention claimed is:

1. A low-gloss anti-graffiti coating formulation comprising a mixture of:
   between about 40 and 80 percent by weight of an acrylate silica blend for reducing gloss by blending silica and by forming an incompatible phase during curing to produce microroughness;
   between about 1 and 20 percent by weight of an acrylate selected from the group consisting of an aliphatic urethane acrylate and a polyester acrylate;
   between about 5 and 35 percent by weight of an erythritol polyacrylate diluent for increasing crosslink density, hardness, toughness, and chemical resistance of a surface coated with said mixture; and
   between about 0.1 and 10 percent by weight of a crosslinkable silicone acrylate to enhance the anti-graffiti property of said mixture.

2. The coating formulation according to claim 1, further comprising at least one photoinitiator for initiating photopolymerization of chemically unsaturated prepolymers and monomers of said mixture.

3. The coating formulation according to claim 2, comprising at least two photoinitiators.

4. The coating formulation according to claim 2, wherein said photoinitiator comprises α-hydroxyketone.

5. The coating formulation according to claim 2, wherein said photoinitiator is present in an amount between about 0.5 and 5 percent by weight of the total weight of the formulation.

6. The coating formulation according to claim 2, wherein said photoinitiator is responsive to ultraviolet radiation.

7. The coating formulation according to claim 1, further comprising a polymeric dispersant for stabilizing the silica in said formulation.

8. The coating formulation according to claim 7, wherein said polymeric dispersant comprises a carboxy functional polyacrylate.

9. The coating formulation according to claim 7, wherein said polymeric dispersant is present in an amount between about 0.05 and 2 percent by weight of the total weight of the formulation.

10. The coating formulation according to claim 1 further comprising a solvent compatible with said formulation.

11. The coating formulation according to claim 10, wherein said solvent is selected from the group consisting of acetates, aromatics, and combinations thereof.

12. The coating formulation according to claim 1, wherein the acrylate silica blend comprises:
   dipropylene glycol diacrylate in an amount of between about 30 and 50 weight percent of said blend;
   isodecyl acrylate in an amount of between about 10 and 30 weight percent of said blend; and
   silica in an amount of between about 0.1 to 20 weight percent of the blend.

13. The coating formulation according to claim 1, wherein the acrylate silica blend is present in said coating formulation in an amount between about 50 and 70 percent by weight.

14. The coating formulation according to claim 1, wherein said aliphatic urethane acrylate comprises:
   urethane acrylate in an amount of between about 40 to 60 weight percent of said aliphatic urethane acrylate; and
   tripropyleneglycol diacrylate in an amount of between about 40 to 60 weight percent of said aliphatic urethane acrylate.

15. The coating formulation according to claim 1, wherein said erythritol polyacrylate diluent comprises dipentaerythritol monohydroxy pentaacrylate.

16. An electron beam curable coating formulation according to claim 1.

17. A coating formulation comprising a mixture of:
   between about 40 and 80 percent by weight of an acrylate silica blend for reducing gloss by blending silica and by forming an incompatible phase during curing to produce microroughness;
   between about 1 and 20 percent by weight of an acrylate selected from the group consisting of an aliphatic urethane acrylate and a polyester acrylate for enhancing physical properties of the mixture;
   between about 5 and 35 percent by weight of a polyfunctional reactive diluent for increasing crosslink density and the hardness, toughness, and chemical resistance of a surface coated with said mixture, when reacted with other oligomers and monomers of said mixture; and
   between about 0.1 and 10 percent by weight of a crosslinkable silicone acrylate to enhance the anti-graffiti property of said mixture;
   said coating formulation having a gloss of less than 25 gloss units measured at 60 degrees when cured.

18. The coating formulation according to claim 17 further comprising at least one photoinitiator for initiating photopolymerization of chemically unsaturated prepolymers and monomers of said mixture.

19. The coating formulation according to claim 18 comprising at least two photoinitiators.

20. The coating formulation according to claim 18 wherein said photoinitiator comprises a-hydroxyketone.

21. The coating formulation according to claim 18 wherein said photoinitiator is present in an amount between about 0.5 and 5 percent by weight of the total weight of the formulation.

22. The coating formulation according to claim 18 wherein said photoinitiator is responsive to ultraviolet radiation.

23. The coating formulation according to claim 18 further comprising a polymeric dispersant for stabilizing the silica in said formulation.

24. The coating formulation according to claim 23 wherein said polymeric dispersant comprises a carboxy functional polyacrylate.

25. The coating formulation according to claim 23 wherein said polymeric dispersant is present in an amount between about 0.05 and 2 percent by weight of the total weight of the formulation.

26. The coating formulation according to claim 18 further comprising a solvent compatible with said formulation.

27. The coating formulation according to claim 26 wherein said solvent is selected from the group consisting of acetates, aromatics, and combinations thereof.

28. The coating formulation according to claim 17 wherein the acrylate silica blend comprises:
dipropylene glycol diacrylate in an amount of between about 30 and 50 weight percent of said blend;
isodecyl acrylate in an amount of between about 10 and 30 weight percent of said blend;
a polyester acrylate in an amount of between about 30 and 50 weight percent of the blend; and
silica in an amount of between about 0.1 to 20 weight percent of the blend.

29. The coating formulation according to claim 17 wherein the acrylate silica blend is present in said coating formulation in an amount between about 50 and 70 percent by weight.

30. The coating formulation according to claim 17 wherein said aliphatic urethane acrylate comprises:
urethane acrylate in an amount of between about 40 to 60 weight percent of said aliphatic urethane acrylate; and
tripropyleneglycol diacrylate in an amount of between about 40 to 60 weight percent of said aliphatic urethane acrylate.

31. The coating formulation according to claim 17 wherein said polyfunctional reactive diluent comprises dipentaerythritol monohydroxy pentaacrylate.

\* \* \* \* \*